United States Patent [19]
Hayashi et al.

[11] Patent Number: 5,198,629
[45] Date of Patent: Mar. 30, 1993

[54] STEERING WHEEL HAVING INSERT MOLDED MEMBRANE SWITCH

[75] Inventors: Chikahisa Hayashi, Anjo; Yoshio Sano, Gifu; Junichi Mizutani, Inazawa; Takanori Kantou, Nagoya; Hiroaki Shinto, Toyota; Sumio Sakaguchi, Susono, all of Japan

[73] Assignee: Toyoda Gosei Co., Ltd., Nishikasugai, Japan

[21] Appl. No.: 892,675

[22] Filed: Jun. 4, 1992

Related U.S. Application Data

[63] Continuation of Ser. No. 604,474, Oct. 29, 1990, abandoned.

[30] Foreign Application Priority Data

| Oct. 30, 1989 | [JP] | Japan | 1-283654 |
| Oct. 30, 1989 | [JP] | Japan | 1-283655 |
| Oct. 30, 1989 | [JP] | Japan | 1-283656 |

[51] Int. Cl.$^5$ ............................................. B60R 21/22
[52] U.S. Cl. ................................. 200/61.54; 280/731; 200/512
[58] Field of Search ..................... 280/731, 728, 743; 200/61.54, 61.55, 86 R, 512, 513, 516, 514

[56] References Cited

U.S. PATENT DOCUMENTS

| 2,611,049 | 9/1952 | Roby | 200/86 R |
| 2,790,873 | 4/1957 | Fleming | 200/86 R |
| 3,819,205 | 6/1974 | Dunford et al. | 280/731 |
| 4,317,013 | 2/1982 | Larson | 200/512 |
| 4,320,573 | 3/1982 | Larson | 200/512 |
| 4,349,712 | 9/1982 | Michalski | 200/513 |
| 4,612,425 | 9/1986 | Kanai et al. | 200/61.55 |
| 4,677,417 | 6/1987 | Amagishi | 200/86 R |
| 4,714,806 | 12/1987 | Inui et al. | 200/61.55 |
| 4,852,907 | 8/1989 | Shiraki et al. | 280/731 |
| 4,903,986 | 2/1990 | Cok et al. | 280/731 |
| 4,934,735 | 6/1990 | Embach | 280/731 |
| 5,002,306 | 3/1991 | Hiramitsu et al. | 280/731 |

FOREIGN PATENT DOCUMENTS

| 60-170121 | 9/1985 | Japan . |
| 62-141559 | 9/1987 | Japan . |
| 64-32251 | 2/1989 | Japan . |

*Primary Examiner*—Karin L. Tyson
*Attorney, Agent, or Firm*—Cushman, Darby & Cushman

[57] ABSTRACT

A horn switch for a steering wheel having an air bag device. The steering wheel includes a multilayer membrane switch as the horn switch in which spacers in one layer are not aligned with the spacers in the other layers. Accordingly, even when the membrane switch is depressed just over one of the spacers in one layer, the electrode plates in the other layers can make contact with each other. Thus the operable area of the membrane switch is enlarged. Further, the membrane switch is supported on its lower surface by a number of ribs which define a number of spaces between the pad lower surface and air bag device. As a result of this space, the operation on the membrane switch can be made resilient in spite of the provision of the air bag device directly under the steering wheel pad. Further, because each part of the pad separated by the air bag device upon impact, each part must be provided with a membrane switch. For this reason, a wiring structure for the two membrane switches is provided such that the manufacture of the pad and the assembly of the steering wheel is more easily facilitated.

15 Claims, 11 Drawing Sheets

STEERING WHEEL HAVING INSERT MOLDED MEMBRANE SWITCH

This is a continuation of application Ser. No. 07/604,474, filed Oct. 29, 1990, now abandoned.

BACKGROUND OF THE INVENTION

1. Field of the invention

The present invention relates to a steering wheel equipped with an air bag device for impact absorption. More particularly, the present invention relates to an improvement in the operability of a horn switch formed in the steering wheel.

2. Description of the Prior Art

Conventional air bag devices are accommodated in a lower portion of the steering wheel pad. The known air bag device includes an air bag adapted to separate the upper surface of the pad into two parts upon operation thereof and thereafter to expand out of the pad from such a separated portion of the upper surface. One such steering wheel is disclosed in Japanese Utility Model Laid-open Publication No. 62-141559. The steering wheel there is equipped with an air bag device and includes a horn switch mounted on a side wall of the air bag retainer. Another air bag steering wheel, disclosed in Japanese Utility Model Laid-Open Publication No. 64-32251, includes a membrane switch insert molded on an upper wall of the pad which functions as the horn switch contact member. It has been proposed that this membrane switch be constructed of a pair of sheet-like electrode plates functioning as the contact member with a plurality of spacers interposed between the electrode plates serving to define an electrode gap.

It has also been proposed that such a membrane switch have a multilayer structure which comprises a plurality of independent plane switches overlapping each other as disclosed in Japanese patent Laid-open Publication No. 60-170121. In this membrane switch, the plane switches being operated are selected according to the degree of depression force being applied to the operation surface of the membrane switch In the steering wheel having membrane switches, the horn is sounded by depressing the upper surface of the pad to short-circuit the electrode plates of the membrane switch.

Figure 6:
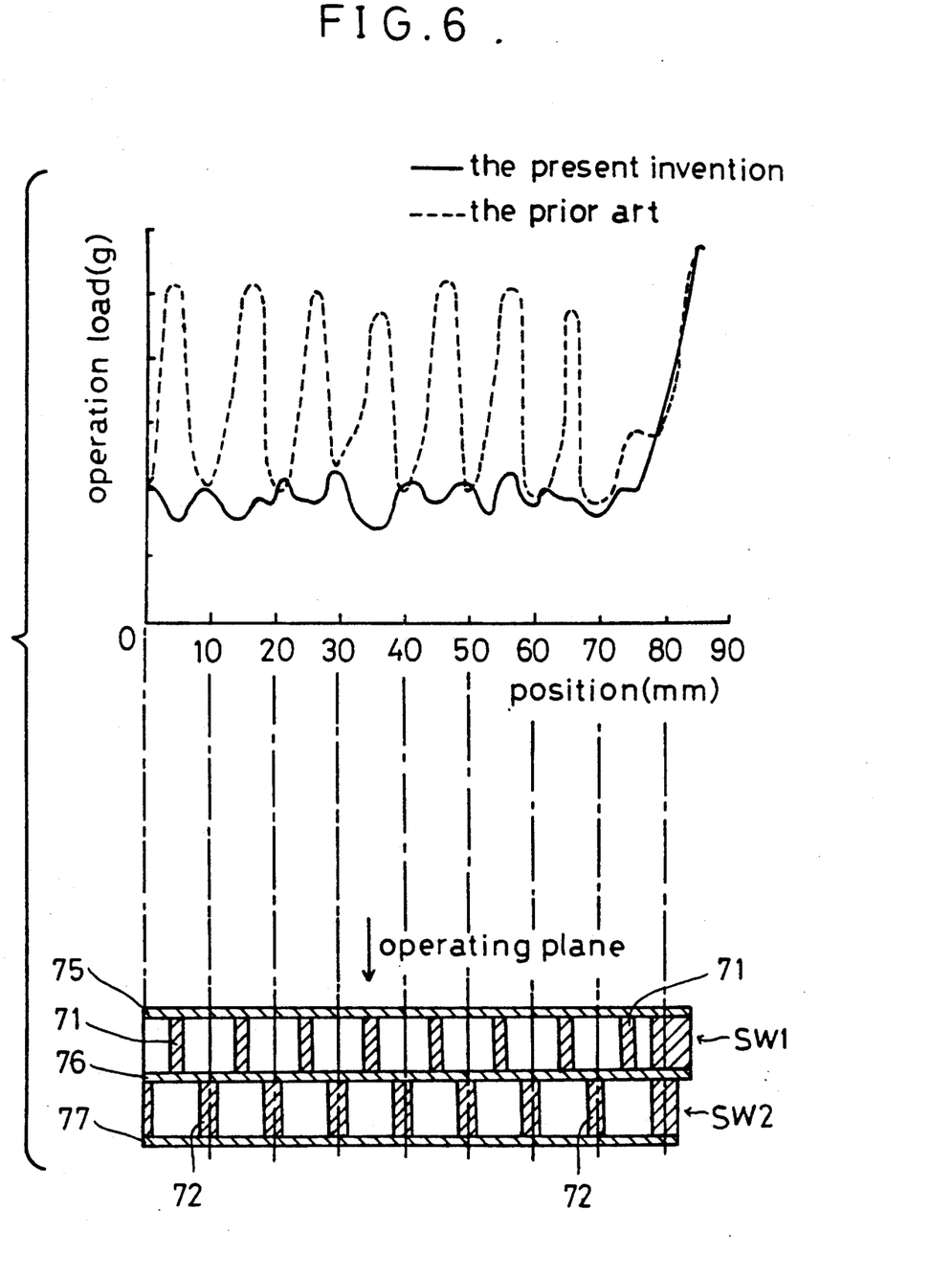
FIG. 6 is a characteristic graph showing the relation between an operation load and a depressed position on the membrane switch according to the present invention in comparison with the prior art.

However, because the plurality of spacers serving to define the electrode gap are interposed between the electrode plates as mentioned above, the depression force required to operate the switch differs when the pad is being depressed at a position just over the location of one of the spacers and when the pad is being depressed at a position not just over location of one of the spacers (see the dashed line, which indicates the characteristics of operation load about a single layer of the switch SW1, shown in FIG. 6). Thus, the depression force necessary to activate the horn with such a switch can vary greatly and is extremely location dependent.

Further, in the above-mentioned steering wheel, almost the whole lower surface of the membrane switch disclosed is closely supported by a rigid surface such as the upper surface of the air bag device. Accordingly, such a switch lacks elasticity in the direction perpendicular to the operational surface of the switch, that is, in the direction the depression force is to be applied. As a result, in the case where it is desired to short sound the horn by lightly tapping the upper surface of the pad, such as is done for greeting, this switch can not be closed long enough to reliably sound the horn for brief periods of time.

Finally, the above membrane switch causes additional complications when both the air bag device and the membrane switch are installed in the steering wheel. Because the pad is separated into two parts by the operation of the air bag device, the membrane switch should be installed in each of the two parts of the pad. Accordingly, it is necessary to provide wiring for each membrane switch. The required wiring is complicated. Furthermore, the wiring should not interfere with assembly or removal of the pad. Such requirements can not be met by any of the known methods.

SUMMARY OF THE INVENTION

It is accordingly a first object of the present invention to provide a steering wheel with an air bag device having a horn switch which can be operated with a substantially uniform depression force applied anywhere on its operational surface.

It is a second object of the present invention to provide a steering wheel with an air bag device having a horn switch which can be operated by a small depression force.

It is a third object of the present invention to provide a steering wheel with an air bag device having a horn switch which includes some degree of operational elasticity whereby operator feedback is provided and switch operability is enhanced.

It is a fourth object of the present invention to provide a steering wheel with an air bag device having a horn switch which can be lightly tapped to short-sound the horn for brief periods of time.

It is a fifth object of the present invention to provide a steering wheel with an air bag device having a wiring structure for a horn switch which allows the pad to be separated into two parts upon operation of the air bag.

It is a sixth object of the present invention to simplify the wiring structure necessary when integrally forming the horn switch with the pad.

According to a first feature of the present invention, the spacers in each of the plane switches forming the multilayer membrane switch are not aligned with each other. Further, each of the plane switches are connected in parallel to one another, with each plane switch functioning as an independent switch.

With this construction, even when the depression force is applied at a position just over one of the plane switch spacers, the plane switch the spacer is located in can not be short circuited, but the other plane switches can be. That is, the membrane switch can be operated with a relatively small depression force virtually anywhere on the pad.

According to a second feature of the present invention, a space under the lower surface of the membrane switch is defined. As a result, the membrane switch can be elastically curved downward. Accordingly, even when the upper surface of the pad is lightly tapped, so as to sound the horn, the membrane switch can be curved downwardly at the depressed position and around the same.

Until the membrane switch is returned to its original form after being downwardly curved, a short period of time is required. This period of time is sufficient to ensure enough closing time enough to reliably sound the horn.

Furthermore, the hardness of the operation surface is eliminated, and operator feedback can be improved.

According to a third feature of the present invention, an earth electrode terminal extending from each membrane switch is electrically connected through a conductive fixing member to be inserted into a through-hole to a supporting member on which a core member of the pad is fixed. Accordingly, each membrane switch is grounded to a vehicle body by fixing the pad to the supporting member.

Furthermore, two signal electrodes of the two membrane switches are connected with each other through a lead wire disposed along an outer side wall of the core member, and a connection terminal extends from one of the two signal electrodes to an exposed lower end of the core member. Thus, since the connection terminal is exposed from the pad, an external connector can be easily connected to the connection terminal.

DETAILED DESCRIPTION OF THE PREFERRED EMBODIMENTS

The preferred embodiments of the present invention will now be described with reference to the figures.

Figure 1:
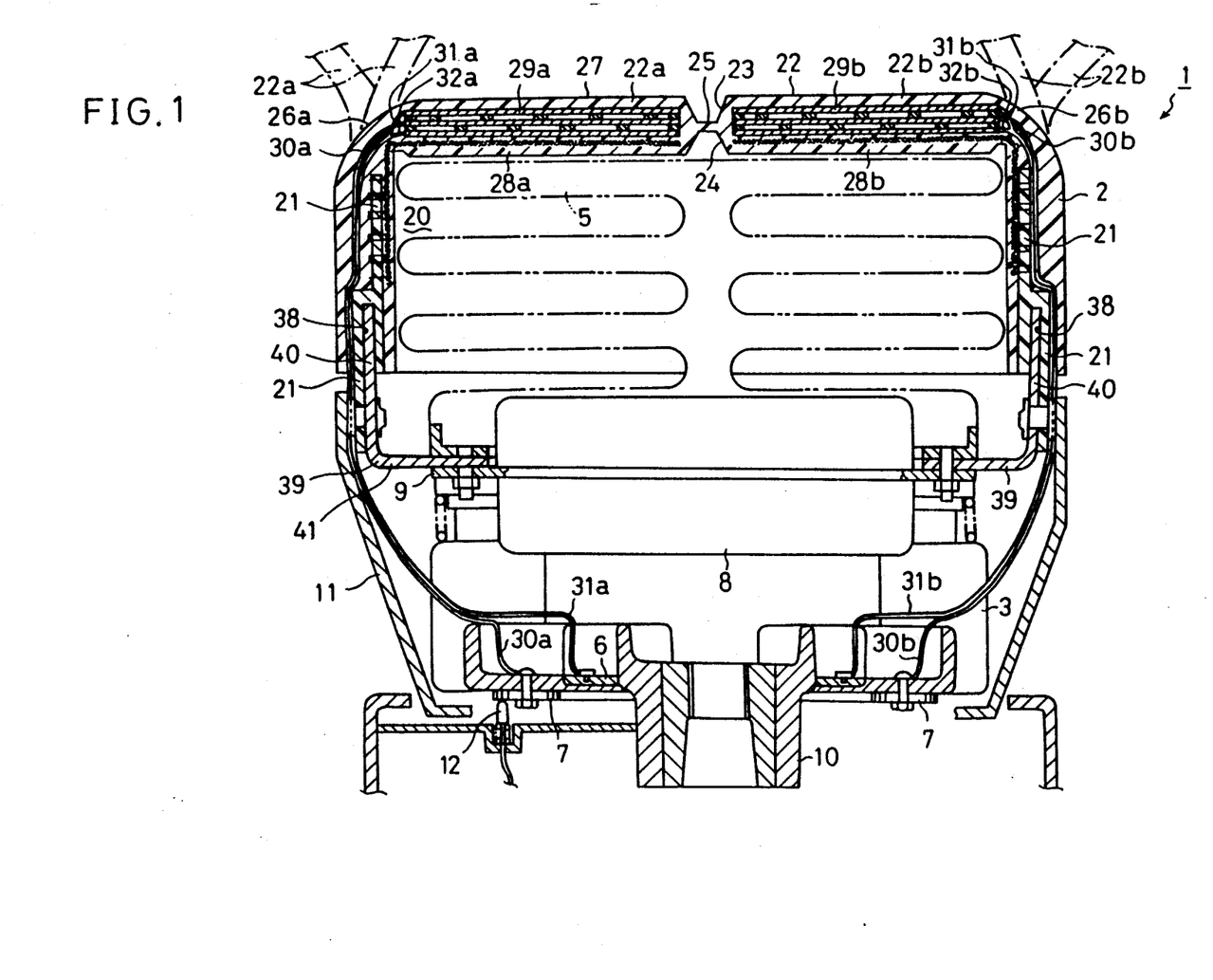
FIG. 1 is a vertical sectional view of a pad of a steering wheel and an associated part of the pad according to a first preferred embodiment of the present invention.
Figure 2:
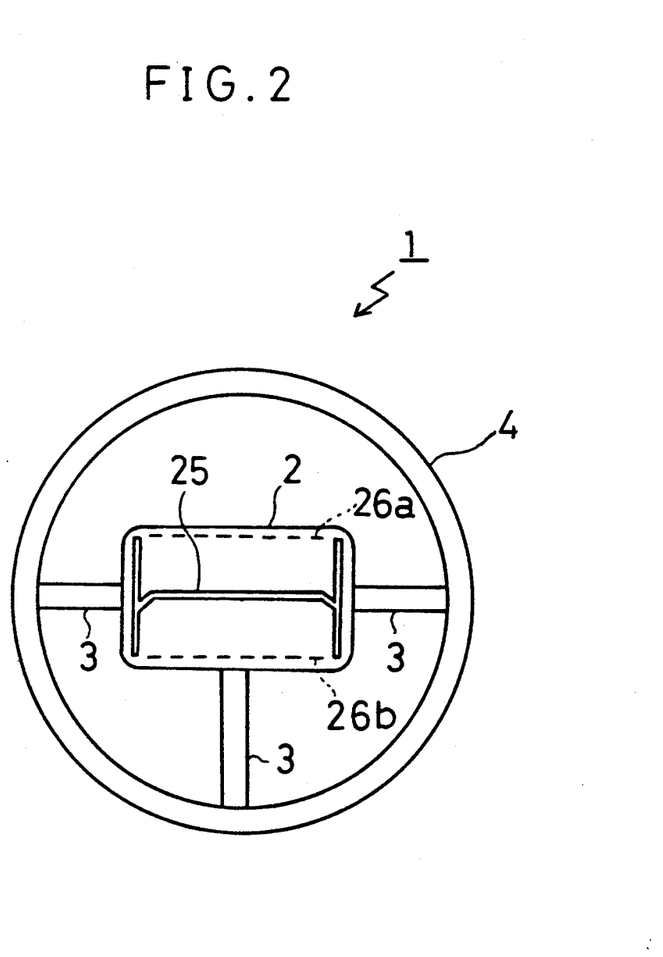
FIG. 2 is a plan view of the steering wheel shown in FIG. 1.

FIG. 2 is a plan view of a steering wheel 1, and FIG. 1 is a vertical sectional view of a central pad 2 and an associated part thereof constituting the steering wheel 1.

Referring to FIG. 2, the steering wheel 1 is constructed of the central pad 2, a plurality of spokes 3 for fixing the pad 2, and a ring 4 integrally formed with the spokes 3. The pad 2 is formed with a thin-walled portion 25 to be cut when an air bag 5 to be hereinafter described is operated.

Referring to FIG. 1, the pad 2 has a box-like shape of substantially rectangular prism to define a space 20 therein, and the air bag 5 is contained with the space 20 in a folded condition.

The pad 2 is formed of foamed urethane, and an annular core member 21, formed of hard resin, is insert-molded in the pad 2. The core member 21 is formed at its lower portion with a double-walled structure having an annular groove 38 opened downwardly. An upper portion of a side portion 40 of a mounting member 39, having a sectional L-shaped annular structure, is inserted in the annular groove 38. A lower portion of the side portion 40 is fixed by rivets to an outer wall of the double-walled structure of the core member 21.

A bottom portion 41 of the mounting member 39 is formed with a central opening, and an inflator 8 is fitted with the central opening. A flange 9 of the inflator 8 is fixed by bolts to the bottom portion 41 of the mounting member 39.

The mounting member 39 is fixed to the spokes 3 extending from a boss 10, thus fixing the pad 2 to the spokes 3. A cover 11 is provided to cover a lower side of the pad 2.

The thin-walled portion 25 is formed on a central position of the upper portion 22 of the pad 2. As shown by phantom lines in FIG. 1, the thin-walled portion 25 can be cut by expansion of the air bag to separate the upper portion 22 into two portions 22a and 22b. The separated upper portions 22a and 22b can be outwardly opened about hinge portions 26a and 26b, respectively. The thin-walled portion 25 is defined by the outer groove 23, which also serves as a design groove, and the inner groove 24.

Two nets 28a and 28b and two membrane switches 29a and 29b are embedded by insert molding in the upper portions 22a and 22b, respectively. An end portion of each of the nets 28a and 28b is fixed to the core member 21 in the pad 2. Lead wires 31a, 30a, 32a and 31b, 30b, 32b are provided to extend from the membrane switches 29a and 29b, respectively. The lead wires 31a and 32a join to extend as the lead wire 31a, and the lead wires 31b and 31b join to extend as the lead wire 31b. The lead wires 31a and 31b serve as earth cables connecting to a metal plate 6 mounted on the boss 10. The lead wires 30a and 30b serve as signal cables and electrically connected to a vehicle body side through a slip ring 7 and a slider 12 in slidable contact with the slip ring 7. Further, a spiral relay system may be used.

The construction of the membrane switch 29a (29b) will now be described in detail with reference to the drawings.

Figure 3:
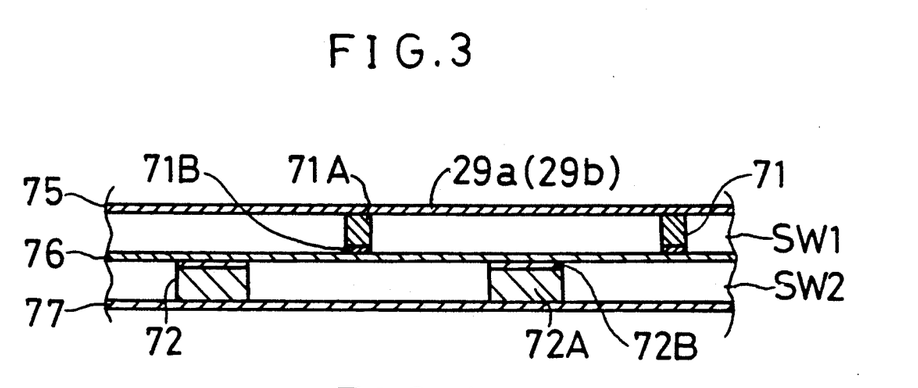
FIG. 3 is an enlarged sectional view of a membrane switch in the first preferred embodiment.
Figure 4:
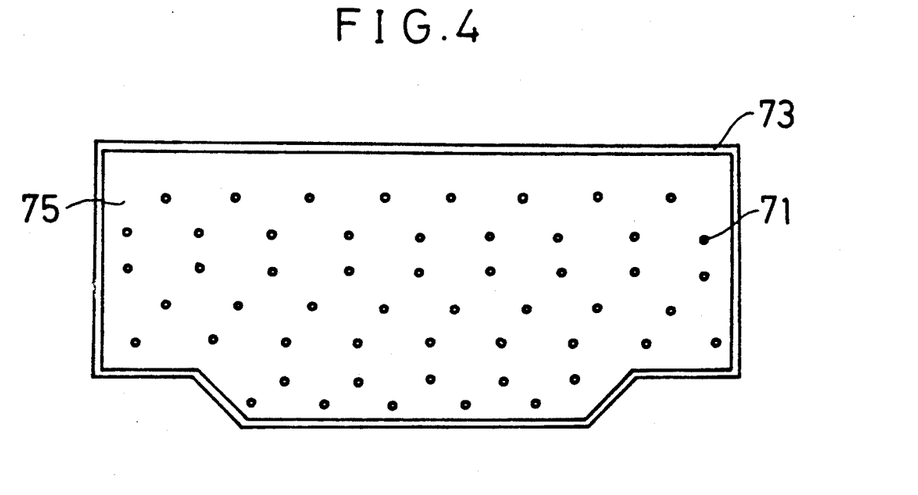
FIGS. 4 and 5 are plan views showing plot patterns of spacers in plane switches SW1 and SW2 of the membrane switch shown in FIG. 3.
Figure 5:
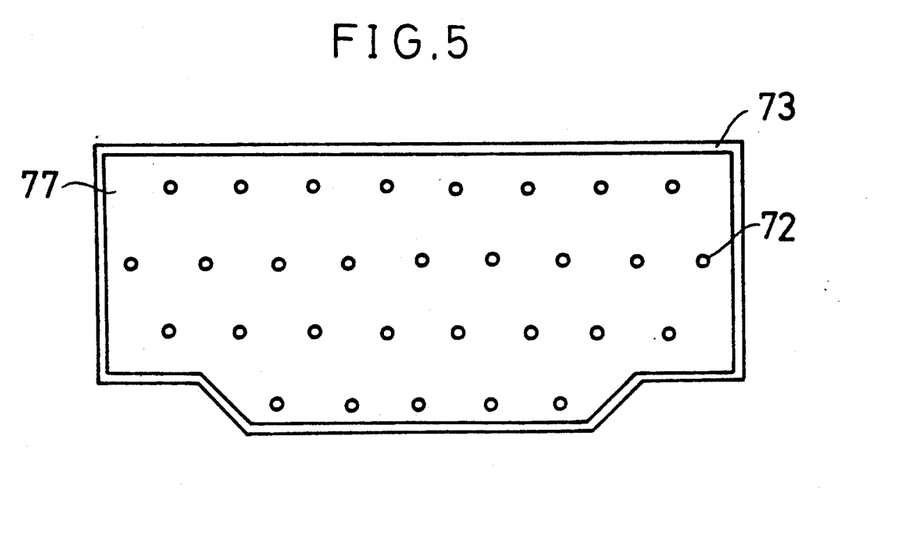

FIG. 3 is a vertical sectional view of the membrane switch 29a (29b), and FIGS. 4 and 5 are plan views showing the plot patterns of spacers provided on the plane switches SW1 and SW2 shown in FIG. 3, respectively.

As shown in FIG. 3, the membrane switch 29a (29b) has a multilayer structure which includes a plane switch SW1 connecting in parallel with a plane switch SW2. That is, a contact member 76 is common to both the switch SW1 and the switch SW2. The other contact members 75 and 77 of the switches SW1 and SW2, respectively, are connected to each other at an end portion thereof (not shown).

The plane switch SW2 is formed by printing a plot pattern of insulator ink 72A having a diameter of 3 mm on the contact member 77 as shown in FIG. 5. The contact member 77 may be constructed of a stainless steel plate having a thickness of 0.1 mm. An adhesive 72B is then printed on each insulator ink 72A, and brought into contact with the contact member 76 to form a bond. The contact member may be a phosphor bronze plate having a thickness of 0.08 mm. Thus, a plurality of spacers 72 are formed between the contact members 76 and 77.

Similarly, the plane switch SW1 is formed by printing a plot pattern of insulator ink 71A having a diameter of 2 mm on the contact member 75 as shown in FIG. 4. The contact member 75 may be constructed of a stainless steel plate having a thickness of 0.1 mm. An adhesive 71B is then printed on each insulator ink 71A, and brought into contact with the contact member 76, thereby bonding the insulator ink 71A through the adhesive 71B to the contact member 76. Thus, a plurality of spacers 71 are formed between the contact members 75 and 76.

The plot pattern of the spacers 71 of the switch SW1 and the plot pattern of the spacers 72 of the switch SW2 are arranged such that each spacer 72 is positioned on contact member 77 at a position whereby each of the spacers 71 adjacent to and just surrounding the spacer 72 are equidistant, and no spacer 72 is positioned directly under one of the spacers 71. Further, insulator ink 73 is applied at peripheral portions of both contact members 75 and 77 so as to bond with the contact member 76 and airtightly seal the outer peripheries of the switches SW1 and SW2.

In the steering wheel having the above-mentioned membrane switch, the operation of the membrane switch will now be described in the case where the pad 2, using substantially the same depression force, is depressed at various locations on the contact member 75 side.

When the depressed position is just over any one of the spacers 71 of the switch SW1, the depression force is applied through the spacer 71 to the contact member 76 to short-circuit the contact members 76 and 77 of the switch SW2. That is, the contact member 76 is urged down at a position just under the spacer 71 to come into contact with the contact member 77.

In contrast, when the pad 2 is depressed at a position between adjacent spacers 71, the contact members 75 and 76 of the switch SW1 are short-circuited. That is, the contact member 75 is urged down at the depressed position to come into contact with the contact member 76.

Thus, wherever the depressed position on the membrane switch is, either the switch SW1 or SW2 can be short-circuited utilizing substantially the same depression force. Therefore, the membrane switch can be used to sound the horn.

In the above preferred embodiment, when the contact member 75 is somewhat more rigid than the contact member 76, the operation of the membrane switch can vary from the above-mentioned operation in the case where the depressed position is between the adjacent spacers 71 of the switch SW1. That is, the depression force is applied through the contact member 75 and the spacer 71 near the depressed position to the contact member 76, and the contact member 76 is resultantly urged down at a position of the spacer 71 to short-circuit the contact members 76 and 77 of the switch SW2. In other words, in this operation, the switch SW1 does not function as a switch but functions as a member for dispersing the depression force. Therefore, the contact member 75 in this case does not require to have a conductivity.

FIG. 6 is a characteristic graph showing the relation between the operation load required for turning on the membrane switch, and the position where the depression force is applied to the pad. The benefit of the present preferred embodiment becomes apparent from analysis of the graph.

As shown in FIG. 6, using the known membrane switch having only the switch SW1, illustrated by the dashed line, the operational load necessary to sound the horn increases at positions corresponding to the location of the spacers 71 of the switch SW1, and decreases at positions between the adjacent spacers 71.

This is to be compared to the multilayered membrane switch of the preferred embodiment which includes both the switch SW1 and SW2. The operational load across the surface of that switch is shown as a solid line in FIG. 6. FIG. 6 illustrates that the operation load required is substantially uniform across the membrane switch operation surface. In other words, the depression force required to sound the horn is substantially uniform irrespective of the depressed position.

As described above, each plane switch is constructed of a pair of electrode plates and a plurality of spacers interposed between the electrode plates, further, a plurality of plane switches thus constructed are connected in parallel to form a multilayer membrane switch in such a manner that the spacers of each plane switch are not aligned with those of the other plane switches. With this construction, the operation load required for short-circuiting the membrane switch may be made substantially uniform across the entire operational surface of the membrane switch. Accordingly, it is possible to prevent the problem of horn actuation being dependent on the depressed position depressed.

Figure 7:
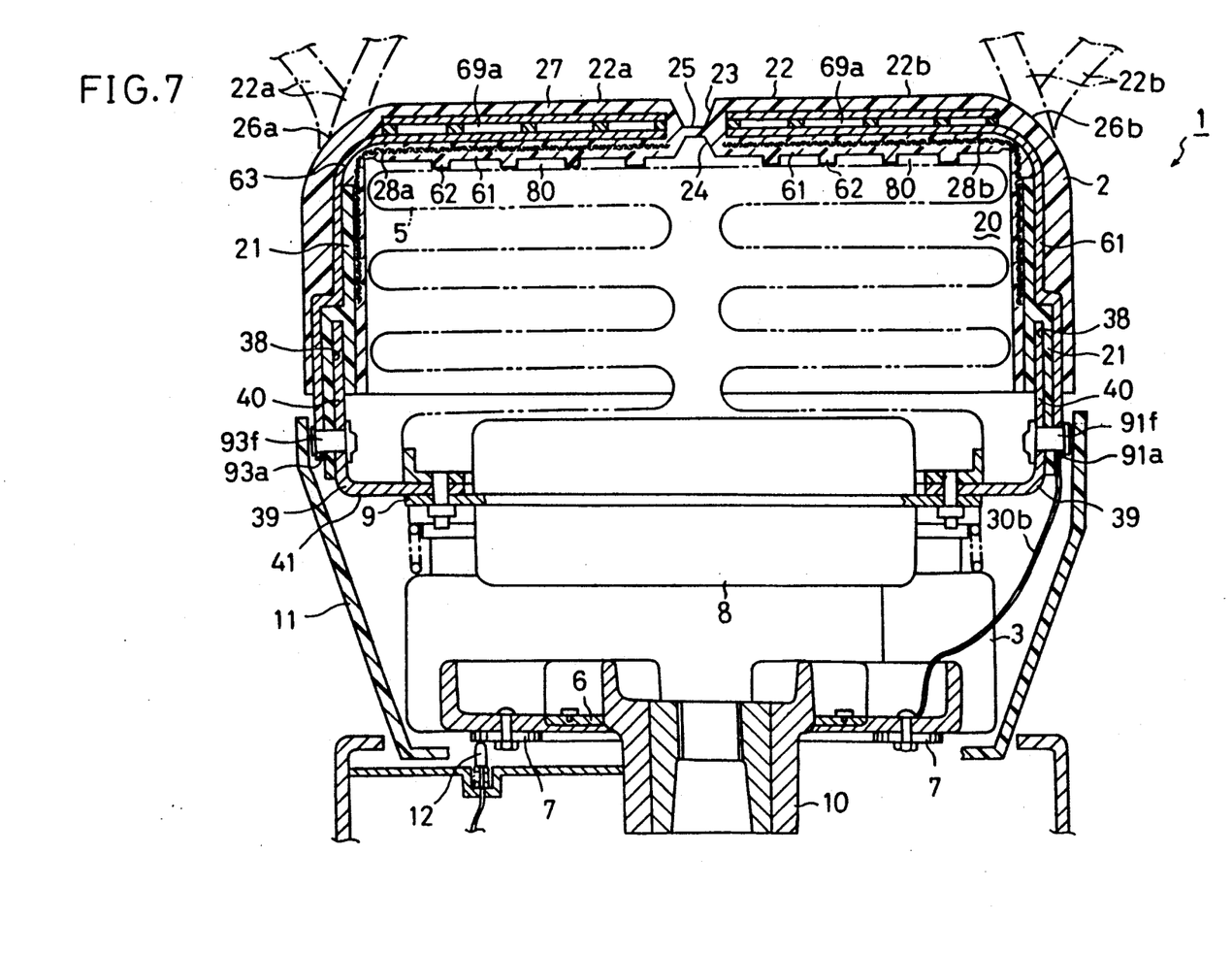
FIG. 7 is a view similar to FIG. 1, showing a second preferred embodiment of the present invention.

FIG. 7 is a vertical sectional view similar to FIG. 1 which illustrates a second preferred embodiment of the present invention. In this second preferred embodiment, a lower surface portion 61 of the pad 2 is formed with a plurality of ribs 62 projecting downwardly, and each of membrane switches 69a and 69b is a single-layer switch.

Figure 8:
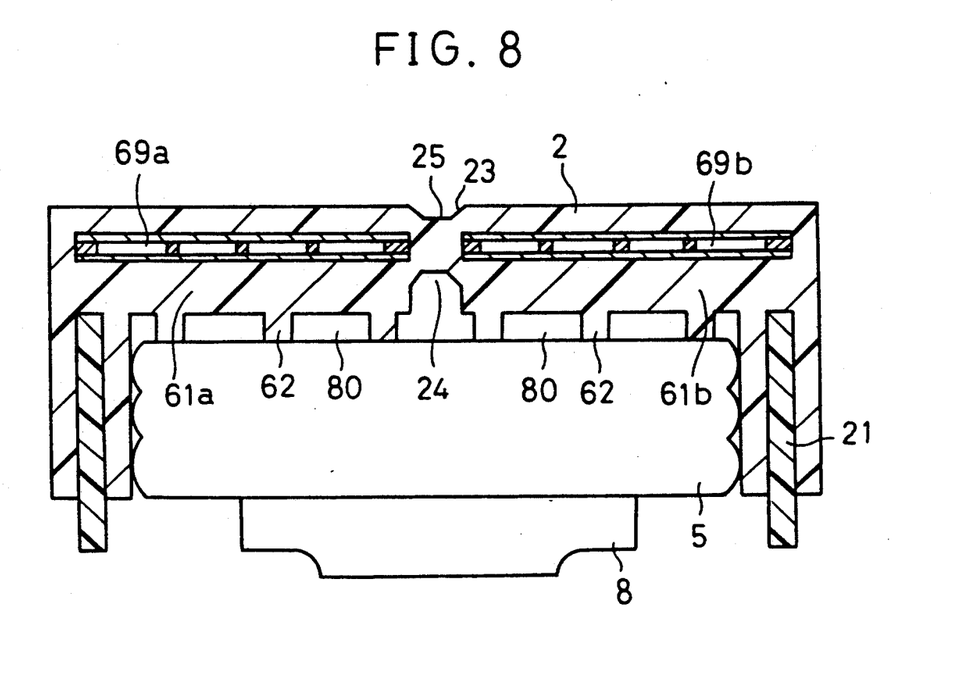
FIG. 8 is an enlarged sectional view of an essential part of the second preferred embodiment.
Figure 9:
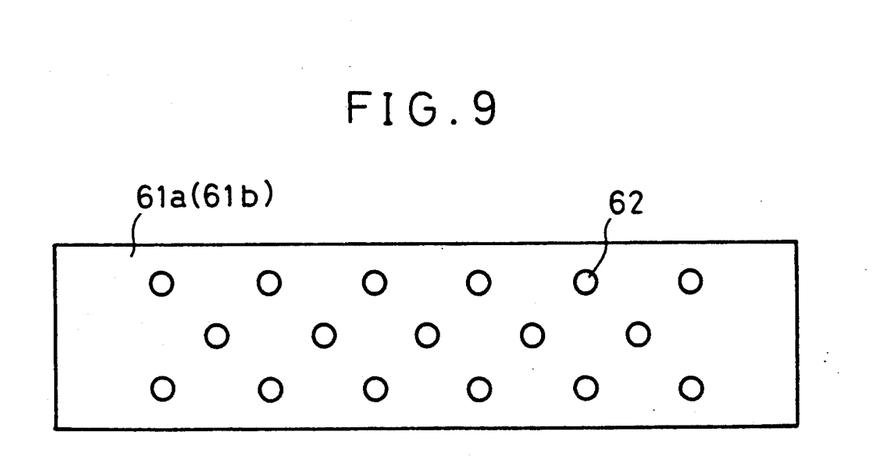
FIG. 9 is a bottom plan view of the pad shown in FIG. 8.

FIG. 8 is an enlarged sectional view of the membrane switch and its associated parts. FIG. 9 is a bottom plan view of the lower surface portion 61 of the pad 2. As shown in FIG. 8, the membrane switches 69a and 69b are insert-molded in the pad 2, and the lower surface portions 61a and 61b of the pad 2 are formed with a plurality of ribs 62 projecting downwardly. A lower end of each rib 62 abuts against an upper surface of the air bag 5. With this construction, a plurality of spaces 80 are defined between the lower surface portion 61 of the pad 2 and the upper surface of the air bag 5. Accordingly, the membrane switches 69a and 69b are indirectly supported through the lower surface portion 61 and the ribs 62 of the pad 2 and by the upper surface of the air bag 5 with spacers 80 being defined between the air bag 5 upper surface and the lower surface portion 61.

The ribs 62 are formed in the pattern illustrated in FIG. 9. However, any other patterns may be employed. Further, although the ribs 62 are depicted in FIG. 9 as having a circular sectional shape, any other sectional shapes may be employed. Further, the elasticity of the lower surface portion 61 may be adjusted by varying the number of ribs 62, and the surface area being occupied by those ribs. The function of the spaces 80 will now be described with reference to FIGS. 10 to 12.

Figure 10:
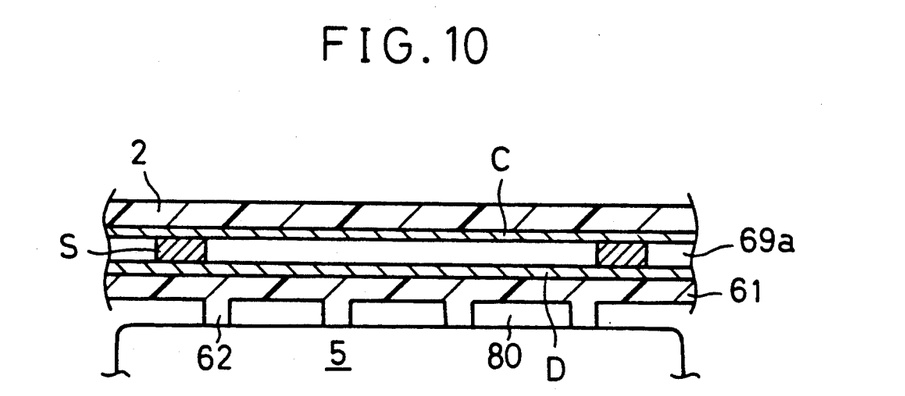
FIGS. 10, 11 and 12 are vertical sectional views showing the operation of the second preferred embodiment.
Figure 11:
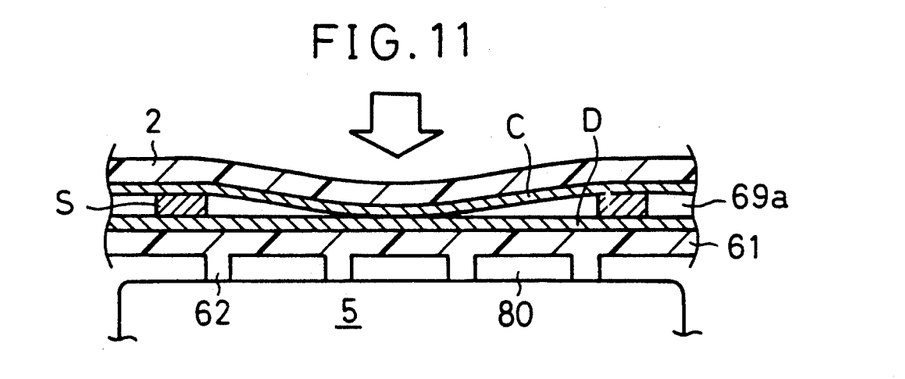

FIG. 10 shows a condition where the membrane switch 69a is not depressed; FIG. 11 shows a condition where the membrane switch 69a starts to be depressed; and FIG. 12 shows a condition where the membrane switch 69a is fully depressed.

Under the condition shown in FIG. 10, the membrane switch 69a is not deformed to open the opposed contact members. That is, electrodes C and D are maintained separate from each other by a plurality of spacers S interposed therebetween. As shown in FIG. 11, when a small depression force is applied to the pad 2, the electrode C curves downwardly and comes into contact with the electrode D. That is, the membrane switch 69a is closed.

Figure 12:
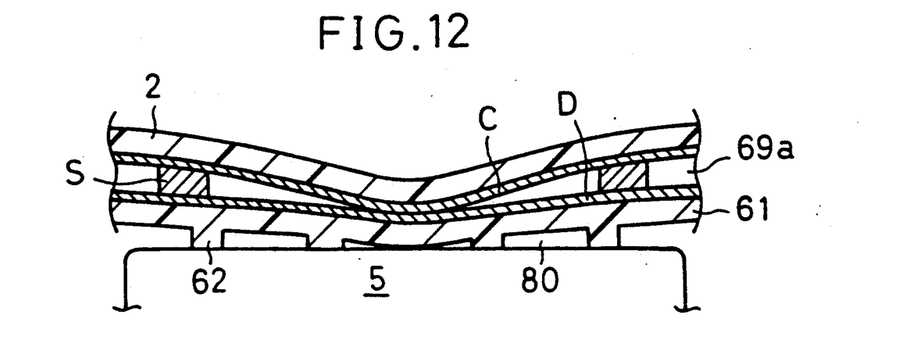

As shown in FIG. 12, when the depression force is increased, the electrodes C and D contacting with each other together curve downwardly as a result of the flexibility provided the space 80. As a result, whenever a depression force is applied to the pad 2, the horn can be reliably sounded. If the space 80 were not provided, the operator's hand would be momentarily repulsed from the condition of FIG. 11 to the condition of FIG. 10, causing problems such as the horn being difficult to sound or, against the operator's will, it will sound for a short period of time. As a result, the operational feeling of the horn is deteriorated.

Figure 13:
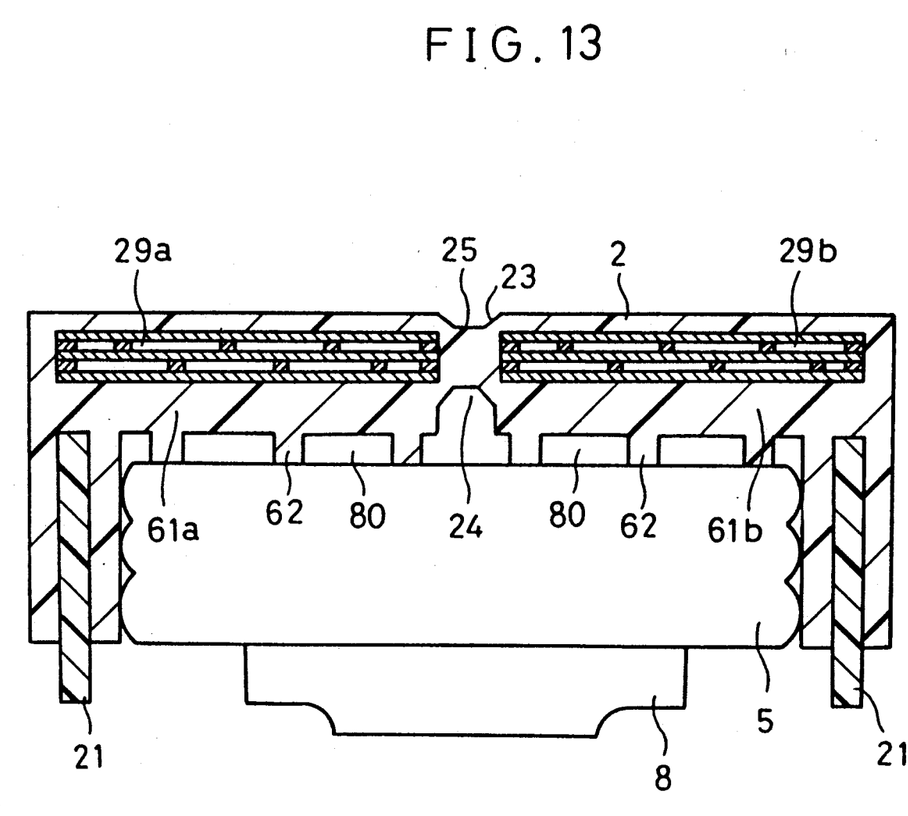
FIG. 13 is a view similar to FIG. 8, showing a modification of the second preferred embodiment.

Although each of the membrane switches 69a and 69b are, in this preferred embodiment, single-layer switches, these may be replaced by dual-layer switches similar to those of the first embodiment, and depicted as 29a and 29b in FIG. 13.

Figure 14:
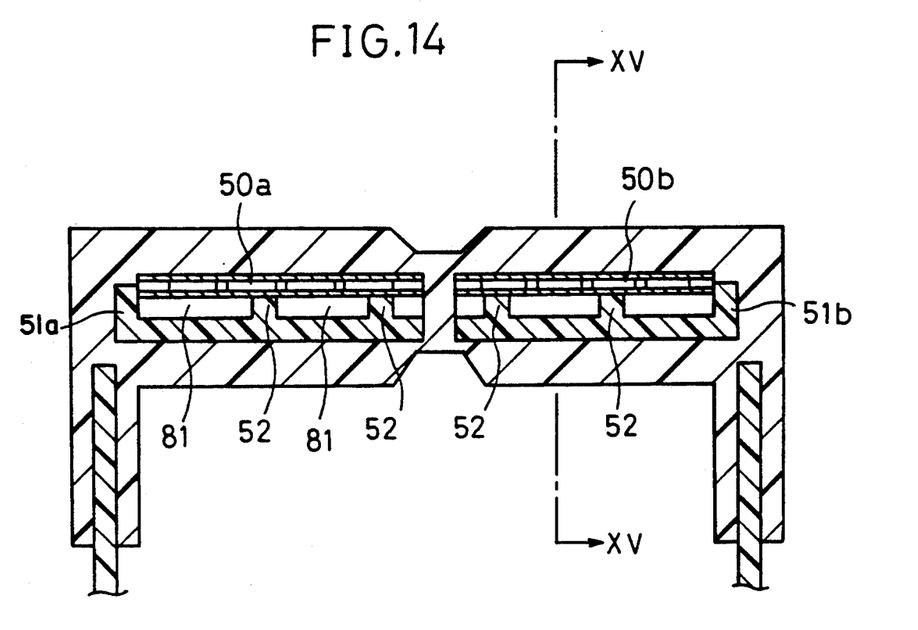
FIG. 14 is a view similar to FIG. 8, showing a further modification of the second preferred embodiment.
Figure 15:
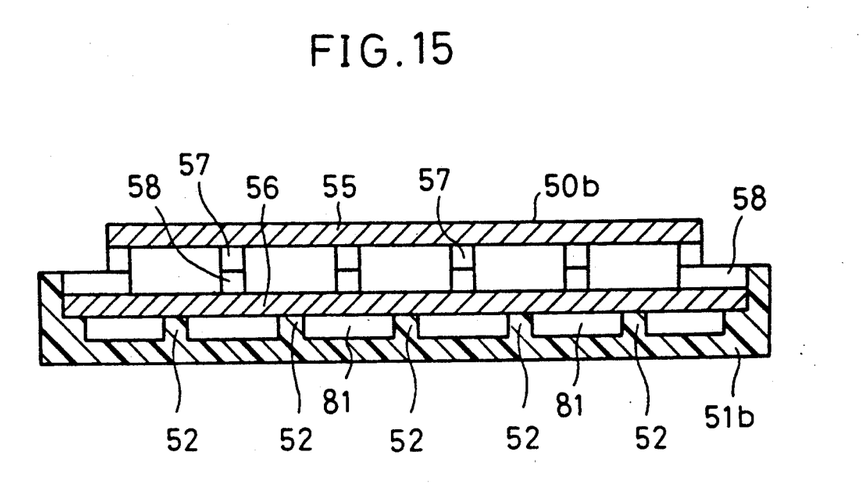
FIG. 15 is a cross section taken along the line XV—XV in FIG. 14.

A modification of the above preferred embodiment will now be described with reference to FIGS. 14 and 15. FIG. 14 is a vertical sectional view of membrane switches 50a and 50b and associated parts thereof, and FIG. 15 is a cross section taken along the line XV—XV in FIG. 14.

In the preferred embodiment shown in FIG. 8, the lower surfaces of the membrane switches 69a and 69b are indirectly supported by the ribs 62 through the lower surface portion 61 of the pad 2 indirectly. According to the present modification, the lower surfaces of the membrane switches 50a and 50b themselves are directly supported by a plurality of ribs 52.

That is, the ribs 52 are integrally formed with resin plates 51a and 51b. The resin plates 51a and 51b are insert-molded with the membrane switches 50a and 50b in the pad 2 in such a manner that the ribs 52 project upwardly from the upper surfaces of the resin plates 51a and 51b to contact the lower surfaces of the membrane switches 50a and 50b, thereby defining a plurality of spaces 81 between the upper surfaces of the resin plates 51a and 51b and the lower surfaces of the membrane switches 50a and 50b.

The operation of the space 81 is substantially the same as that of the space 80 in the preferred embodiment illustrated in FIG. 8. That is, when even a small depression force is applied to the pad 2, and that depression force is an instantaneous application, the membrane switches 50a and 50b can be curved downwardly owing to the space 81, and further, such a curved condition can be maintained for a sufficient period of time. Accordingly, the closed condition of the contact members of each membrane switch can be maintained for the period of time long enough to reliably sound the horn, even when the application force is small and instantaneously applied.

In FIG. 15, reference numerals 55 and 56 designate the upper electrode and the lower electrode of the membrane switch 50b, respectively, and reference numerals 57 and 58 designate adhesive and resist, respectively. The adhesive and resist materials constitute the spacers of the membrane switch 50b.

As described above, according to the second preferred embodiment, the membrane switches 69a, 69b; 29a, 29b; or 50a, 50b are insert-molded in the upper portion of the pad 2, and the ribs 62 or 52, for supporting the membrane switches 69a, 69b; 29a, 29b; or 50a, 50b, are formed in the lower portion of the pad 2 with the space 80 or 81 defined under the lower surface of the membrane switches.

With this construction, the membrane switches 69a, 69b; 29a, 29b; or 50a, 50b may be sufficiently curved downward owing to the presence of the space 80 or 81. Accordingly, even when the pad 2 is depressed only instantaneously, the depressed portion of each membrane switch becomes downwardly curved and the switch closing time is long enough to reliably sound the horn. Furthermore, because the surface of the pad 2 need not be so rigid with the switch of the present embodiment, the operational feeling of the horn switch thus constructed is improved.

The following is a third preferred embodiment which relates to an improvement in the wiring structure for the membrane switch. The construction of the third preferred embodiment is similar to that of the second preferred embodiment shown in FIG. 7 except for the wiring structure.

Figure 16:
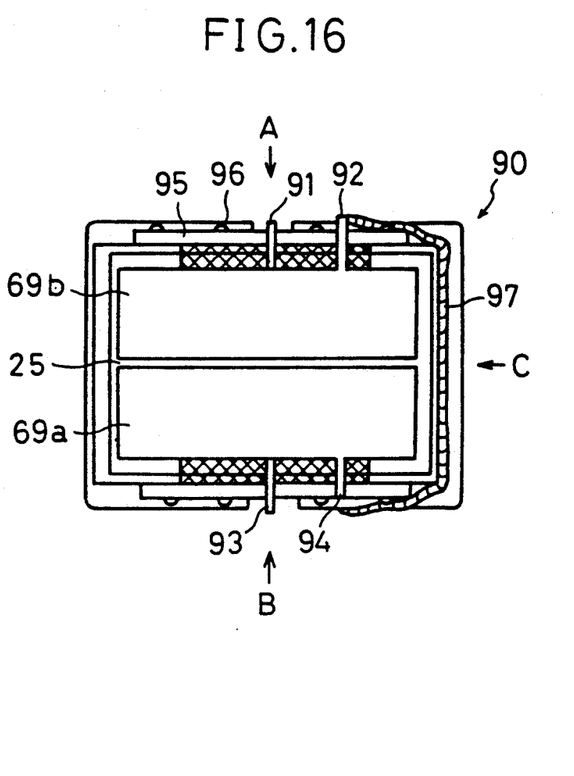
FIG. 16 is a top plan view of a subassembly to be inserted in the pad of the steering wheel according to a third preferred embodiment of the present invention.
Figure 17:
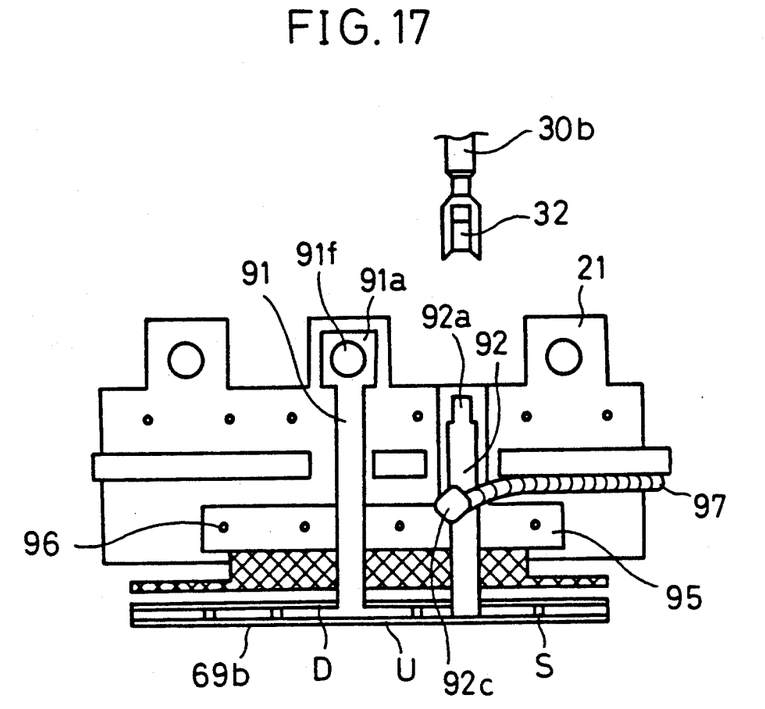
FIG. 17 is a side view taken in the direction A shown in FIG. 16.
Figure 18:
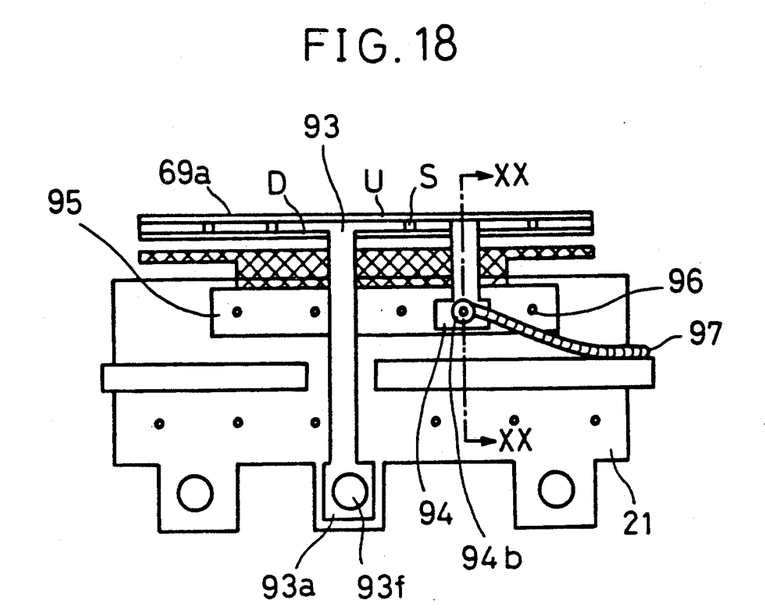
FIG. 18 is a side view taken in the direction B shown in FIG. 16.
Figure 19:
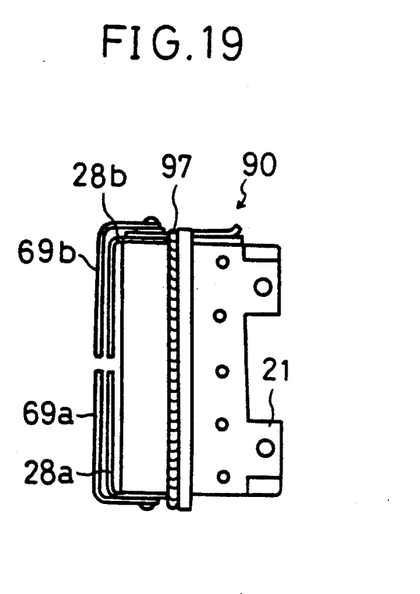
FIG. 19 is a side view taken in the direction C shown in FIG. 16.
Figure 20:
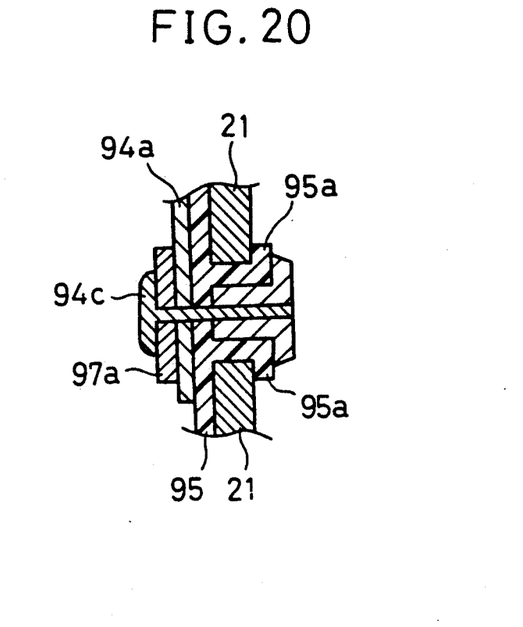
FIG. 20 is a cross section taken along the line XX—XX in FIG. 18.

FIG. 16 is a top plan view of a subassembly 90 which is insert-molded in the pad 2. FIGS. 17, 18 and 19 are side views taken in the directions A, B and C shown in FIG. 16, respectively. Further, FIG. 20 is a cross section taken along the line XX—XX in FIG. 18.

The membrane switch in this preferred embodiment is constructed of two membrane switches 69a and 69b separated at the boundary of the thin-walled portion 25. (see FIG. 16). It is this thin-walled portion 25 that is to be cut upon operation of the air bag device. Each of the membrane switches 69a and 69b are a plane switch constructed of an upper electrode U, a lower electrode D and a plurality of spacers S interposed therebetween for defining an electrode gap. The plane switch is turned on when the upper electrode U comes into contact with the lower electrode D (see FIGS. 17 and 18).

An earth electrode terminal 91 extends sidewardly from the lower electrode D of the membrane switch 69b and then extends downwardly (upwardly as viewed in FIG. 17) along an outer wall of the aluminum core member 21. A lower end 91a of the earth electrode terminal 91 is fastened by a conductive rivet 91f (opposite ends thereof being hammered) through the core member 21 and the side portion 40 of the conductive supporting member (bag holder) 39 (see FIGS. 7, 16 and 17). Thus, the lower electrode D of the membrane switch 69b is grounded to the vehicle body.

A signal electrode terminal 92 extends sidewardly from the upper electrode U, and then extends downwardly (upwardly as viewed in FIG. 17) along the outer wall of the core member 21 with a nylon sheet 95 serving as an insulator interposed therebetween.

A lower end 92a of the signal electrode terminal 92 is formed as a connection terminal exposed from the urethane skin of the pad 2. A connector 32 of the lead wire 30b connected to the slip ring 7 is connected to this connection terminal 92a. The slip ring 7 is in slidable contact with the slider 12. (See: FIG. 7.) Thus, the upper electrode U of the membrane switch 69b is connected to an electronic device mounted on the vehicle body. The connection of the upper electrode U to the electronic device may also be effected by a spiral relay system. The nylon sheet 95, which serves as the insulator, is fixed to the core member 21 by a plurality of fixing members 96. Since FIG. 7 is a cross section taken along a center line of the earth electrode terminal 91, the signal electrode terminal 92 does not appear in FIG. 7.

On the other hand, an earth electrode terminal 93 extends downwardly from the lower electrode D of the membrane switch 69a, and a lower end 93a of the earth electrode terminal 93 is fastened by a conductive rivet 93f through the core member 21 and the side portion 40 of the conductive supporting member 39 in the same manner as in the case of the membrane switch 69b. Thus, the lower electrode D of the membrane switch 69a is grounded to the vehicle body (see FIGS. 7, 16 and 18).

A signal electrode terminal 94 extends downwardly from the upper electrode U of the membrane switch 69a, and a lower end 94a of the signal electrode terminal 94 is insulated from the core member 21 by a nylon sheet 95 in the same manner as in the case of the membrane switch 69b. One end 97a of the lead wire 97 is connected to the lower end 94a (see FIGS. 16 and 18). As shown in FIG. 20, the connection of the lead wire 97 to the lower end 94a is effected by fastening the one end 97a of the lead wire 97 to the lower end 94a of the signal electrode terminal 94 with use of a conductive rivet 94c. As is shown in FIG. 19, the lead wire 97 is located so as to surround almost half the periphery of the outer side wall of the core member 21, and, as is shown in FIG. 17, the other end of the lead wire 97 is fixedly connected to the signal electrode terminal 92 of the membrane switch 69b by means of a conductive rivet 92c. Accordingly, the signal electrode terminal 94 of the membrane switch 69a is connected through the lead wire 97 to the signal electrode terminal 92 of the membrane switch 69b. Thus, the upper electrode U of both the membrane switches 69a and 69b are commonly connected to the electronic device on the vehicle body through the connector 32, the lead wire 30b, the slip ring 7 and the slider 12.

Although the core member 21 is formed of aluminum (conductive material) in the above preferred embodiment, it may also be formed of a non-conductive material. In the later case, the nylon sheets 95 serving to insulate the signal electrode terminals 92 and 94 from the core member 21 are unnecessary.

According to the third preferred embodiment, the membrane switches 69a and 69b are provided over the entire surface of the pad 2, so that the switch operation can be easily carried out. Further, as the earth electrode terminals 91 and 93 of the membrane switches 69a and 69b are fixed through the core member 21 to the conductive supporting member 39 by means of the conductive rivets 91f and 93f, respectively, the membrane switches 69a and 69b are simultaneously grounded to the vehicle body.

Furthermore, as the common connection terminal 92a is exposed from the lower end of the pad 2, the connector 32 may be easily connected to the connection terminal 92a. That is, the extraction of the electrodes in the molded pad can be easily carried out. Moreover, the wiring of the membrane switches 69a and 69b can be achieved in the molded pad, and the assembling of the steering wheel can be easily carried out.

While the invention has been described in connection with what is presently considered to be the most practical and presently preferred embodiments, the invention is not to be limited to these disclosed embodiments. It is to be understood that various modifications could be made without departing from the spirit and scope of the present invention.

What is claimed is:
1. A steering wheel comprising:
   a pad provided at a central portion of the steering wheel;
   an air bag device provided under said pad and adapted to separate said pad and expand out of said pad upon receipt of an impact;
   two membrane switches disposed in two parts of an upper portion of said pad to be separated by said air bag device;
   a conducive supporting member electrically connected to a vehicle and adapted to fix said air bag device to said vehicle body;
   a reinforcing core member disposed on or in a side wall of said pad and having a lower end portion exposed from said side wall, said exposed lower end portion being formed with two through-holes;
   two earth electrode terminals extending from two earth electrodes of said two membrane switches along an outer wall of said core member to positions of said two through-holes;
   two conductive fixing members inserted into said two through-holes, respectively, for fixing said core member to said supporting member and electrically connecting said earth electrode terminals to said supporting member;
   two signal electrode terminals extending from two signal electrodes of said two membrane switches along said outer wall of said core member;
   a connection wire for connecting said two signal electrode terminals with each other, said connection wire being arranged around said outer wall of said core member; and
   a connection terminal extending from one of said signal electrode terminals along said outer wall of said core member to a position of said exposed lower end portion.

2. The steering wheel as defined in claim 1, further comprising a supporting member for supporting said membrane switches so as to define a space under said membrane switches.

3. The steering wheel as defined in claim 2, wherein said supporting member comprises a plurality of ribs projecting from a lower surface of said pad and abutting an upper surface of said air bag device.

4. The steering wheel as defined in claim 2, wherein said supporting member comprises a plurality of ribs projecting from an upper surface of a support plate embedded in said pad and contacting a lower surface of said membrane switch.

5. The steering wheel as defined in claim 2, wherein each of said membrane switches comprises a pair of electrode plates functioning as contact members and a plot pattern of insulator ink printed on an inner surface of either of said electrode plates functioning as spacers defining an electrode gap.

6. The steering wheel as defined in claim 1, wherein each of said membrane switches comprises a pair of electrode plates functioning as contact members and a plot pattern of insulator ink printed on an inner surface of either of said electrode plates functioning as spacers defining an electrode gap.

7. The steering wheel as defined in claim 6, wherein each of said plane switches further includes an adhesive printed on said plot pattern of insulator ink.

8. A steering wheel comprising:
a pad provided at a central portion of said steering wheel;
an air bag device provided under said pad and adapted to separate said pad and expand out of said pad upon receipt of an impact;
two membrane switches disposed in two parts of an upper portion of said pad to be separated by said air bag device, each of said membrane switches having a multilayer structure comprised of a plurality of plane switches connected in parallel to each other, each of said plane switches comprising a pair of electrode plates functioning as contact members and a plurality of spacers interposed between said electrode plates for defining an electrode gap, said spacers in each of said plane switches being located so as not to be aligned with spacers in other plane switches;
a conductive supporting member electrically connected to a vehicle body and adapted to fix said air bag device to said vehicle body;
a reinforcing core member disposed on or in a side wall of said pad and having a lower end portion exposed from said side wall, said exposed lower end portion being formed with two through-holes;
two earth electrode terminals extending from two earth electrodes of said two membrane switches along an outer wall of said core member to positions of said two through-holes;
two conductive fixing members inserted into said two through-holes, respectively, for fixing said core member to said supporting member and electrically connecting said earth electrode terminals to said supporting member;
two signal electrode terminals extending from two signal electrodes of said two membrane switches along said outer wall of said core member;
a connection wire for connecting said two signal electrode terminals with each other, said connection wire being arranged around said outer wall of said core member; and
a connection terminal extending from one of said signal electrode terminals along said outer wall of said core member to a position of said exposed lower end portion.

9. The steering wheel as defined in claim 8, further comprising a supporting member for supporting said membrane switches so as to define a space under said membrane switches.

10. The steering wheel as defined in claim 8, wherein each of said membrane switches has a dual-layer structure including a first electrode plate, a second electrode plate, a third electrode plate electrically connected to said first electrode plate defining said pair of electrode plates functioning as contact members, said first to third electrode plates being arranged in parallel in this order, a first plot pattern of insulator ink printed on an inner surface of either said first electrode plate and said second electrode plate functioning as spacers defining an electrode gap and second plot pattern of insulator ink printed on an inner surface of either said third electrode plate and said second electrode plate functioning as spacers defining an electrode gap, said first plot pattern being located so as to not be aligned with said second plot pattern.

11. The steering wheel as defined in claim 10, wherein a diameter of said first plot pattern is smaller than a diameter of said second plot pattern.

12. The steering wheel as defined in claim 10, wherein said first plot pattern is located at an equivalent distance from an adjacent plot pattern of said second plot pattern.

13. The steering wheel as defined in claim 10, wherein said membrane switch further includes a first adhesive printed on said first plot pattern of insulator ink and a second adhesive printed on said second plot pattern of insulator ink.

14. The steering wheel as defined in claim 8, wherein each of said membrane switches has a first plot pattern of insulator ink printed on an inner surface of one of said electrode plates functioning as spacers defining an electrode gap, an operating plate arranged in parallel to ne of said electrode plates and a second plot pattern of insulator ink printed on an inner surface of either said operating plate and said electrode plate opposite to said operating plate functioning as spacers defining an electrode gap, said first plot pattern being located so as to not be aligned with said second plot pattern.

15. The steering wheel as defined in claim 14, wherein said membrane switch further includes a first adhesive printed on said first plot pattern of insulator ink and a second adhesive printed on said second plot pattern of insulator ink.

* * * * *